(12) United States Patent
Akiyama (10) Patent No.: US 11,190,739 B2
(45) Date of Patent: Nov. 30, 2021

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/708,495

(22) Filed: Dec. 10, 2019

(65) Prior Publication Data

US 2020/0186760 A1 Jun. 11, 2020

(30) Foreign Application Priority Data

Dec. 11, 2018 (JP) .............................. JP2018-231368

(51) Int. Cl.
*H04N 9/31* (2006.01)
*G03B 21/20* (2006.01)
*G02B 27/14* (2006.01)

(52) U.S. Cl.
CPC ......... *H04N 9/3105* (2013.01); *G02B 27/141* (2013.01); *G03B 21/208* (2013.01); *G03B 21/2033* (2013.01); *H04N 9/3161* (2013.01); *H04N 9/3164* (2013.01); *H04N 9/3167* (2013.01)

(58) Field of Classification Search
CPC .. G03B 21/005; G03B 21/006; G03B 21/008; G03B 21/28; G03B 21/145; G03B 21/208; G03B 21/2013; G03B 21/2033; G02B 27/48; G02B 27/0101; G02B 27/123; G02B 27/141; G02B 27/149; G02B 27/283; G02B 27/286; G02B 27/0944; G02B 27/1033; H04N 9/315; H04N 9/3102; H04N 9/3105;
(Continued)

(56) References Cited

U.S. PATENT DOCUMENTS

| | | | |
|---|---|---|---|
| 2012/0050690 A1* | 3/2012 | Enomoto | H04N 9/315 353/31 |
| 2012/0092624 A1* | 4/2012 | Oiwa | G03B 21/2033 353/31 |

(Continued)

FOREIGN PATENT DOCUMENTS

| | | |
|---|---|---|
| JP | H11-064789 A | 3/1999 |
| JP | 2017-009683 A | 1/2017 |
| WO | 2015/056381 A1 | 4/2015 |

*Primary Examiner* — Sultan Chowdhury
(74) *Attorney, Agent, or Firm* — Dority & Manning, P.A.

(57) ABSTRACT

An illuminator includes a first laser light source section that outputs a first light flux that belongs to a first wavelength band, a second laser light source section that outputs a second light flux that belongs to a second wavelength band, a third laser light source section that outputs a third light flux that belongs to a third wavelength band and has a polarization direction different from those of the first and second light fluxes, a light combiner that combines the first, second, and third light fluxes to produce combined light, and a predetermined band retardation film on the downstream of the light combiner that changes the phase of a light flux that forms the combined light and belongs to the third wavelength band, and the polarization directions of the light fluxes contained in the combined light are aligned on the downstream of the predetermined band retardation film.

20 Claims, 5 Drawing Sheets

(58) Field of Classification Search
CPC .. H04N 9/3152; H04N 9/3161; H04N 9/3164; H04N 9/3167; H04N 9/3197
See application file for complete search history.

(56) References Cited

U.S. PATENT DOCUMENTS

| | | | |
|---|---|---|---|
| 2014/0098349 A1* | 4/2014 | Nagasawa | G03B 33/12 353/31 |
| 2015/0153020 A1* | 6/2015 | Akiyama | H04N 9/3194 353/20 |
| 2016/0077417 A1* | 3/2016 | Ishikawa | G03B 21/2013 353/20 |
| 2016/0198135 A1 | 7/2016 | Kita et al. | |
| 2016/0370696 A1 | 12/2016 | Akiyama | |
| 2018/0017856 A1* | 1/2018 | Tanaka | G02B 5/3083 |
| 2019/0199981 A1* | 6/2019 | Murakami | G03B 21/008 |

* cited by examiner

ILLUMINATOR AND PROJECTOR

The present application is based on, and claims priority from JP Application Serial Number 2018-231368, filed Dec. 11, 2018, the disclosure of which is hereby incorporated by reference herein in its entirety.

BACKGROUND

1. Technical Field

The present disclosure relates to an illuminator and a projector.

2. Related Art

There is a projector of related art that causes RGB light fluxes separated from white illumination light outputted from an illuminator to be incident on three liquid crystal panels to display an image (see JP-A-2017-9683, for example).

The projector described above, however, requires a polarization converter for aligning the polarization direction of the illumination light with the direction of the axis of transmission of a polarizer disposed on the light incident side of each of the liquid crystal panels. The polarization converter therefore causes a problem of increases in size and cost of the illuminator.

SUMMARY

According to a first aspect of the present disclosure, there is provided an illuminator including a first laser light source section that outputs a first light flux that belongs to a first wavelength band, a second laser light source section that outputs a second light flux that belongs to a second wavelength band, a third laser light source section that outputs a third light flux that belongs to a third wavelength band and has a polarization direction different from polarization directions of the first and second light fluxes, a light combiner that combines the first, second, and third light fluxes with one another to produce combined light, and a predetermined band retardation film that is provided on a downstream of the light combiner and changes a phase of a light flux that forms the combined light and belongs to the third wavelength band, and the polarization directions of the light fluxes contained in the combined light are aligned with one another on the downstream of the predetermined band retardation film.

In the first aspect described above, the illuminator may further include a diffuser provided on the downstream of the predetermined band retardation film.

In the first aspect described above, the predetermined band retardation film may be a half-wave plate.

According to a second aspect of the present disclosure, there is provided an illuminator including a light source apparatus including a first laser light source section that outputs a first light flux that belongs to a first wavelength band, a second laser light source section that outputs a second light flux that belongs to a second wavelength band, and a third laser light source section that outputs a third light flux that belongs to a third wavelength band and has a polarization direction different from polarization directions of the first and second light fluxes, the light source apparatus outputting light containing the first, second, and third light fluxes, a light combiner/separator that separates the light outputted from the light source apparatus into the third light flux and a mixture of the first and second light fluxes, a first diffuser on which the third light flux separated by the light combiner/separator is incident, a first retardation film provided between the first diffuser and the light combiner/separator, a second diffuser on which the first and second light fluxes separated by the light combiner/separator are incident, a second retardation film provided between the second diffuser and the light combiner/separator, and a predetermined band retardation film provided on a downstream of the light combiner/separator. The light combiner/separator combines the third light flux diffused by the first diffuser with the first and second light fluxes diffused by the second diffuser to produce combined diffused light. The predetermined band retardation film changes a phase of a light flux that forms the combined diffused light and belongs to the third wavelength band. Polarization directions of the light fluxes contained in the combined diffused light are aligned with one another on the downstream of the retardation film.

In the second aspect described above, the first, second, and the third light fluxes may be outputted in a first direction. The first laser light source section may be formed of a plurality of first laser devices, the second laser light source section may be formed of a plurality of second laser devices, and the third laser light source section may be formed of at least one third laser device. The number of first laser devices may be greater than the number of third laser devices. The first laser devices may be so provided as to be rotationally symmetric around a center axis of the third light flux and as to surround the third laser device. The number of second laser devices may be greater than the number of third laser devices. The second laser devices may be so provided as to be rotationally symmetric around the center axis of the third light flux and as to surround the third laser device.

In the second aspect described above, the first light flux may be a red light flux, the second light flux may be a green light flux, the third light flux may be a blue light flux, and the light source section may include three of the first laser devices, three of the second laser devices, and one of the third laser devices.

In the second aspect described above, an angle of diffusion of the third light flux diffused by the first diffuser may be greater than angles of diffusion of the first and second light fluxes diffused by the second diffuser.

In the second aspect described above, the predetermined band retardation film may be a half-wave plate, and the first and second retardation films may each be a quarter-wave plate.

According to a third aspect of the present disclosure, there is provided a projector including the illuminator according to the first or second aspect described above, a light modulator that modulates light from the illuminator in accordance with image information to form image light, and a projection optical apparatus that projects the image light.

DESCRIPTION OF EXEMPLARY EMBODIMENTS

Embodiments of the present disclosure will be described below in detail with reference to the drawings.

An example of a projector according to an embodiment of the present disclosure will first be described.

Figure 1:
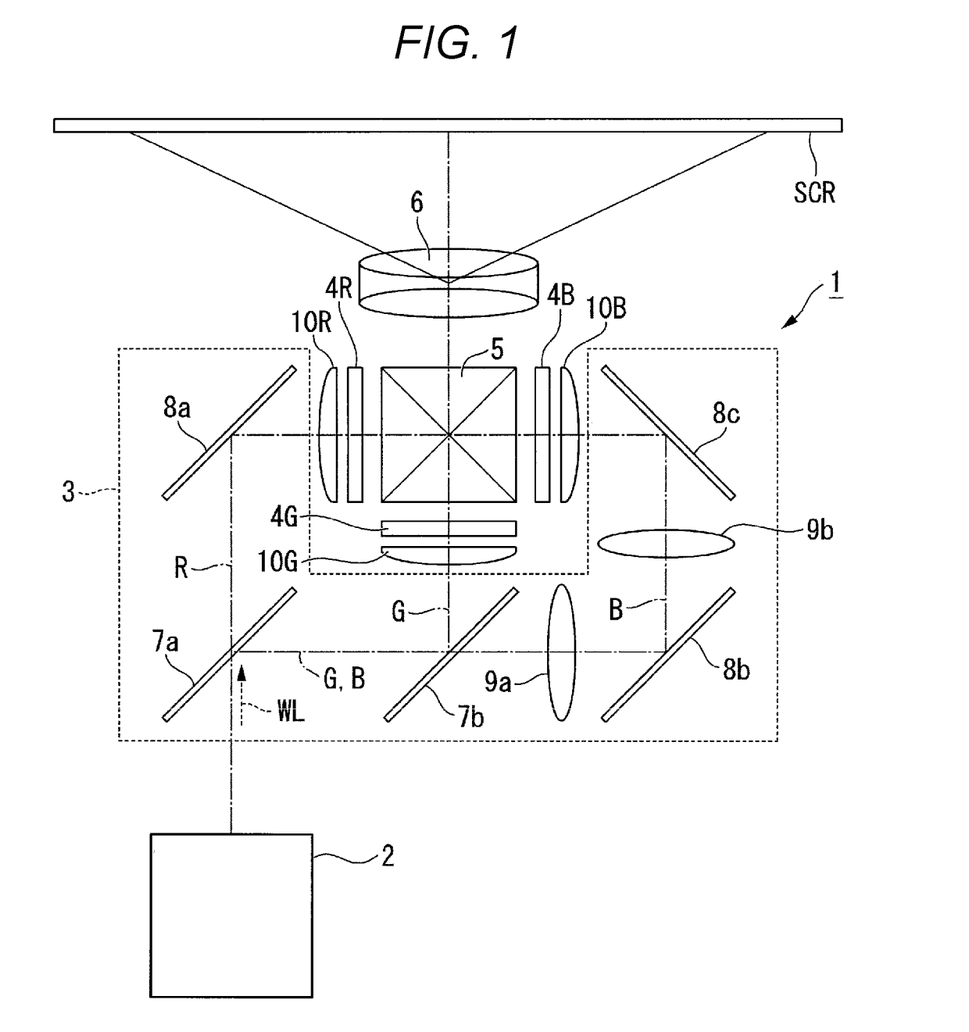
FIG. 1 shows a schematic configuration of a projector according to a first embodiment.

FIG. 1 shows a schematic configuration of the projector according to the present embodiment.

A projector 1 according to the present embodiment is a projection-type image display apparatus that displays color video images on a screen SCR. The projector 1 includes an illuminator 2, a color separation system 3, a light modulator 4R, a light modulator 4G, a light modulator 4B, a light combining system 5, and a projection optical apparatus 6.

The color separation system 3 separates illumination light WL outputted from the illuminator 2 into red illumination light R, green illumination light G, and blue illumination light B. The color separation system 3 includes a dichroic mirror 7a, a dichroic mirror 7b, a total reflection mirror 8a, a total reflection mirror 8b, a total reflection mirror 8c, a first relay lens 9a and a second relay lens 9b. Red, green, and blue are hereinafter collectively called RGB in some cases.

The dichroic mirror 7a separates the illumination light WL from the illuminator 2 into the red illumination light R and the other light (green illumination light G and blue illumination light B). The dichroic mirror 7a transmits the red illumination light R and reflects the other light. The dichroic mirror 7b reflects the green illumination light G and transmits the blue illumination light B.

The total reflection mirror 8a reflects the red illumination light R toward the light modulator 4R. The total reflection mirrors 8b and 8c guide the blue illumination light B toward the light modulator 4B. The green illumination light G is reflected off the dichroic mirror 7b toward the light modulator 4G.

The first relay lens 9a and the second relay lens 9b are disposed in the optical path of the blue illumination light B on the downstream of the dichroic mirror 7b.

The light modulator 4R modulates the red illumination light R in accordance with image information to form a red image light flux. The light modulator 4G modulates the green illumination light G in accordance with image information to form a green image light flux. The light modulator 4B modulates the blue illumination light B in accordance with image information to form a blue image light flux.

The light modulators 4R, 4G, and 4B are each formed, for example, of a transmissive liquid crystal panel. Polarizers (not shown) are disposed on the light incident side and the light exiting side of each of the liquid crystal panels. In the present embodiment, the axis of transmission of the polarizer on the light incident side of each of the liquid crystal panels corresponds to S polarized light with respect to the color separation system 3.

Field lenses 10R, 10G, and 10G are disposed on the light incident side of the light modulators 4R, 4G, and 4B, respectively.

The image light fluxes from the light modulators 4R, 4G, and 4B are incident on the light combining system 5. The light combining system 5 combines the image light fluxes with one another and causes the combined image light to exit toward the projection optical apparatus 6. The light combining system 5 is formed, for example, of a cross dichroic prism.

The projection optical apparatus 6 is formed of a projection lens group, enlarges the combined image light from the light combining systems 5, and projects the enlarged image light toward the screen SCR. Enlarged color video images are thus displayed on the screen SCR.

Figure 2:
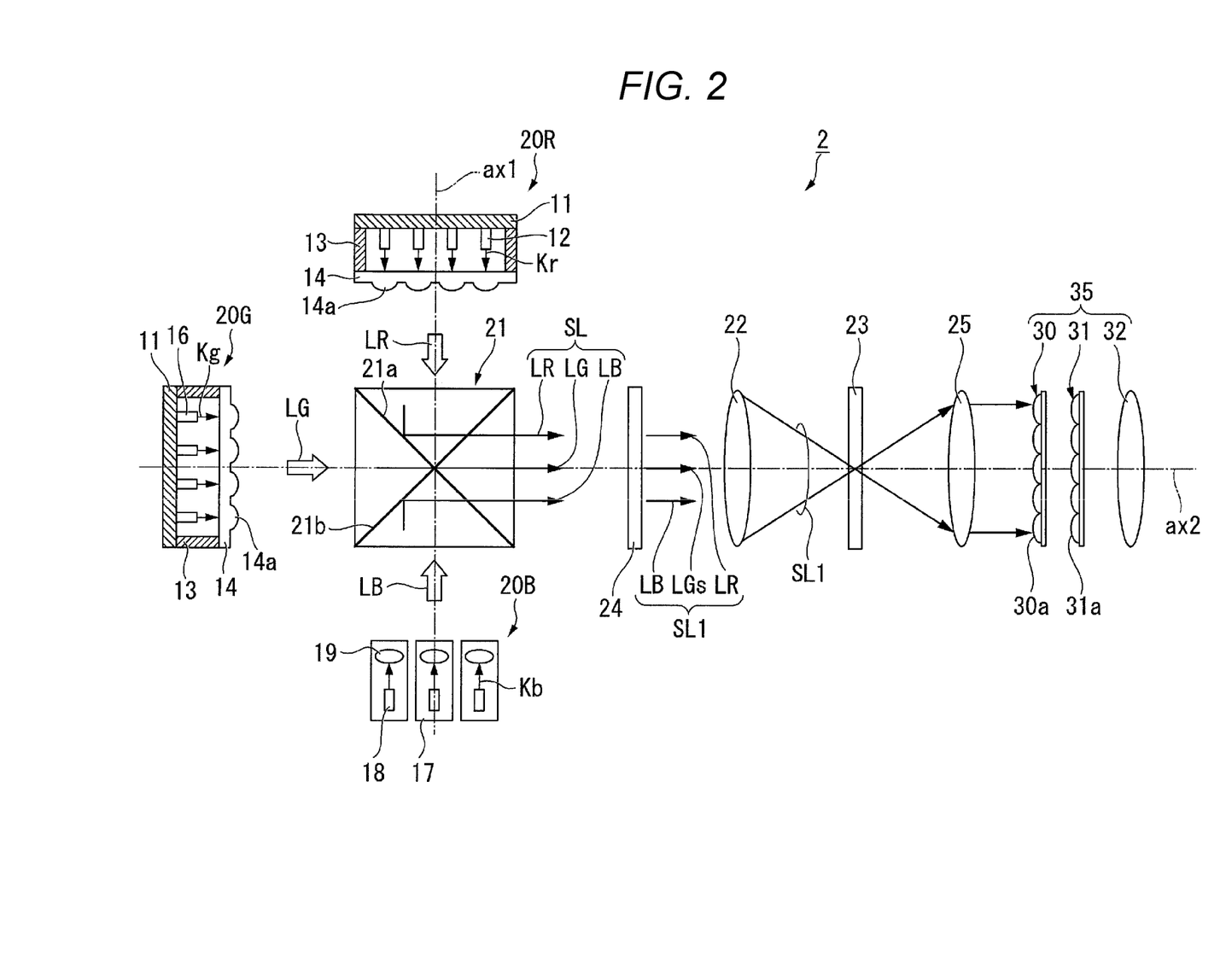
FIG. 2 shows a schematic configuration of an illuminator.

The configuration of the illuminator 2 will subsequently be described. FIG. 2 shows a schematic configuration of the illuminator 2. The illuminator 2 includes a red light source section (first laser light source section) 20R, a blue light source section (second laser light source section) 20B, a green light source section (third laser light source section) 20G, a light combiner 21, a predetermined band retardation film 24, a light collection lens 22, a diffuser 23, a pickup lens 25, and a homogenizing illumination system 35, as shown in FIG. 2.

In the present embodiment, the red light source section 20R, the light combiner 21, and the blue light source section 20B are arranged along an optical axis ax1 of the red light source section 20R. The green light source section 20G, the light combiner 21, the light collection lens 22, the diffuser 23, the pickup lens 25, and the homogenizing illumination system 35 are arranged along an illumination optical axis ax2 of the illuminator 2. The optical axis ax1 and the illumination optical axis ax2 are perpendicular to each other. The optical axis of the blue light source section 20B coincides with the optical axis ax1 of the red light source section 20R, and the optical axis of the green light source section 20G coincides with the illumination optical axis ax2.

The red light source section 20R is formed of a multi-emitter package. The red light source section 20R includes a substrate 11, a plurality of red light emitters 12 arranged in a matrix on the substrate 11, a frame 13, a cover glass plate 14. The substrate 11 is made of a metal having high thermal conductivity, for example, copper.

The plurality of red light emitters 12 are accommodated in the space surrounded by the substrate 11, the frame 13, and the cover glass plate 14. The red light source section 20R in the present embodiment includes, for example, 20 red light emitters 12. The red light emitters 12 are each formed, for example, of a semiconductor laser that outputs a red light beam Kr as laser light that belongs to a first wavelength band having a peak wavelength of 635 nm±20 nm. In the present embodiment, the red light beam Kr outputted from each of the red light emitters 12 is linearly polarized light. More specifically, the red light beam Kr corresponds to S polarized light with respect to the color separating system 3 and can pass through the light-incident-side polarizer for the liquid crystal panel that forms the light modulator 4R. S polarized light with respect to the color separating system 3 is hereinafter simply referred to as "S polarized light."

The frame 13 attaches the cover glass plate 14 to the substrate 11. The cover glass plate 14 is provided with a plurality of collimator lenses 14a integrally therewith. The collimator lenses 14a are each formed of a convex lens. The collimator lenses 14a each parallelize the red light beam Kr outputted from the corresponding red light emitter 12. The collimator lenses 14a may be components separate from the cover glass plate 14.

Based on the configuration described above, the red light source section 20R outputs red light (first light) LR, which is formed of a parallelized light beam flux containing a plurality of red light beams Kr, toward the light combiner 21.

The configuration of the blue light source section 20B will subsequently be described.

The blue light source section 20B includes a plurality of blue light emitting packages 17. The blue light source section 20B in the present embodiment includes three blue light emitting packages 17.

In the present embodiment, the blue light emitting packages 17 are each formed of a CAN-package-type semiconductor laser. The three blue light emitting packages 17 are so disposed as to be axially symmetric with respect to the optical axis ax1 in a plane perpendicular to the optical axis ax1, as shown in FIG. 2.

Specifically, the blue light emitting packages 17 each include one blue light emitter 18 and a collimator lens 19, which are accommodated in the package. The blue light emitter 18 is formed, for example, of a semiconductor laser that outputs a blue light beam Kb as laser light that belongs to a third wavelength band having a peak wavelength of 455 nm±20 nm. In the present embodiment, the blue light beam Kb outputted from each of the blue light emitters 18 is linearly polarized light. More specifically, the blue light beam Kb corresponds to S polarized light with respect to the color separating system 3 and can pass through the light-incident-side polarizer for the liquid crystal panel that forms the light modulator 4B.

The collimator lenses 19 each parallelize the blue light beam Kb outputted from the corresponding blue light emitter 18. The collimator lenses 19 may be components separate from the blue light emitting packages 17.

Based on the configuration described above, the blue light source section 20B outputs blue light (second light) LB, which is formed of a parallelized light beam flux containing a plurality of blue light beams Kb, toward the light combiner 21.

The configuration of the green light source section 20G will subsequently be described. The green light source section 20G has the same configuration as that of the red light source section 20R except the wavelength of the outputted light. The same configurations as those of the red light source section 20R therefore have the same reference characters in the description.

Specifically, the green light source section 20G is formed of a multi-emitter package, as is the red light source section 20R, and includes the substrate 11, a plurality of green light emitters 16 arranged in a matrix on the substrate 11, the frame 13, the cover glass plate 14.

The plurality of green light emitters 16 are accommodated in the space surrounded by the substrate 11, the frame 13, and the cover glass plate 14. The green light source section 20G in the present embodiment includes, for example, 20 green light emitters 16. The green light emitters 16 are each formed, for example, of a semiconductor laser that outputs a green light beam Kg as laser light that belongs to a second wavelength band having a peak wavelength of 550 nm±30 nm. The green light beam Kg outputted from each of the green light emitters 16 is parallelized by the corresponding collimator lens 14a provided at the cover glass plate 14. In the present embodiment, the green light beam Kg outputted from each of the green light emitters 16 is linearly polarized light. More specifically, the green light beam Kg corresponds to P polarized light with respect to the color separating system 3. The green light beam Kg is converted by the predetermined band retardation film 24, which will be described later, into S polarized light and can therefore pass through the light-incident-side polarizer for the liquid crystal panel that forms the light modulator 4G. P polarized light with respect to the color separating system 3 is hereinafter simply referred to as "P polarized light."

Based on the configuration described above, the green light source section 20G outputs green light (third light) LG, which is formed of a parallelized light beam flux containing a plurality of green light beams Kg, toward the light combiner 21. In the present embodiment, the green light LG outputted from the green light source section 20G has a polarization direction different from those of the red light LR outputted from the red light source section 20R and the blue light LB outputted from the blue light source section 20B.

The light emission efficiency of a semiconductor laser device varies on an emitted light color basis, and the power of the light beam from the semiconductor laser device therefore varies on an emitted light color basis. The light emission efficiency of the blue light emitters 18 is higher than the light emission efficiency of the green light emitters 16 and the light emission efficiency of the red light emitters 12. The power of the light beam from the blue light emitters 18 is therefore higher than the power of the light beam from the green light emitters 16 and the power of the light beam from the red light emitters 12. In a case where one light emitting apparatus includes a plurality of light emitters (semiconductor laser devices), the power value of the light from the light emitting apparatus is equal to the sum of the power values of the light beams from the plurality of light emitters.

In the illuminator 2 according to the present embodiment, for example, to achieve white light having a brightness of 6000 lm, the numbers of light emitters in each of the red light source section 20R and the green light source section 20G is set at 20, and the number of light emitters in the blue light source section 20B is set at 3.

The light combiner 21 combines the red light LR, the green light LG, and the blue light LB, which are RGB light fluxes outputted from the red light source section 20R, the blue light source section 20B, and the green light source section 20G. The light combiner 21 is formed of a cross dichroic prism. The light combiner 21 includes a first dichroic mirror 21a and a second dichroic mirror 21b provided among four prisms that form the cross dichroic prism.

The first dichroic mirror 21a and the second dichroic mirror 21b are so disposed as to intersect the optical axis ax1 and the illumination optical axis ax2, respectively, at 45°. The first dichroic mirror 21a and the second dichroic mirror 21b intersect each other in such a way that the angle therebetween is 45°.

The first dichroic mirror 21a is optically characterized in that it reflects the red light LR and transmits the green light LG and the blue light LB. The second dichroic mirror 21b is optically characterized in that it reflects the blue light LB and transmits the red light LR and the green light LG. In the present embodiment, since the green light LG is incident as P polarized light on the dichroic prism, the first dichroic mirror 21a and the second dichroic mirror 21b having the optical characteristics described above are readily designed.

Based on the configuration described above, the light combiner 21 outputs combined light SL, which is the combination of the red light LR, the green light LG, and the blue light LB, toward the predetermined band retardation film 24.

The predetermined band retardation film 24 is a half-wave plate. More specifically, the predetermined band retardation film 24 in the present embodiment is formed of a green-narrow-band ½ retardation film that changes the phase of light that belongs to the wavelength band to which the green light LG belongs. The thus configured predetermined band retardation film 24 selectively changes the phase of the green light LG out of the incident combined light SL. The combined light SL passes through he predetermined band retardation film 24, which converts the combined light SL into combined light SL1.

Specifically, since the green light LG contained in the combined light SL is P polarized light, the green light LG is converted into S-polarized green light LGs when passing through the predetermined band retardation film 24. On the other hand, the red light LR and the blue light LB, which form the remainder of the combined light SL, do not undergo change in the polarization direction when passing through the predetermined band retardation film 24 but remain S polarized. The combined light SL1 having passed through the predetermined band retardation film 24 is therefore formed of the S-polarized red light LR, the S-polarized green light LGs, and the S-polarized blue light LB. The polarization directions of the light fluxes contained in the combined light SL1 are therefore aligned with one another on the downstream of the predetermined band retardation film 24.

The combined light SL1 having passed through the predetermined band retardation film 24 is subsequently collected by the light collection lens 22 and incident on the diffuser 23. The diffuser 23 is disposed on the light exiting side of the light collection lens 22. The diffuser 23 diffuses the combined light SL1 to suppress creation of speckles, which lower image quality.

The diffuser 23 can be formed of a known diffusion film, for example, a ground glass plate, a holographic diffuser, a transparent substrate having a blasted surface, or a transparent substrate that contains dispersed scatterers, such as beads, and causes the scatterers to scatter light.

A configuration in which the diffuser 23 is rotated around a predetermined axis of rotation may be employed. Rotating the diffuser 23 as described above temporally changes the state in which the light passing through the diffuser 23 is diffused to temporally change a speckle pattern. A speckle pattern averaged over time is therefore recognized by a viewer, whereby the speckle noise can be unlikely to be recognizable as compared with a case where the diffuser 23 is not rotated.

The combined light SL diffused by the diffuser 23 is parallelized by the pickup lens 25, and the parallelized combined light SL1 is incident on the homogenizing illumination system 35. The homogenizing illumination system 35 includes a first lens array 30, a second lens array 31, and a superimposing lens 32.

The first lens array 30 includes a plurality of first lenslets 30a for dividing the combined light SL1 having exited out of the diffuser 23 into a plurality of sub-light beam fluxes. The plurality of first lenslets 30a are arranged in an array in a plane perpendicular to the illumination optical axis ax2 of the illuminator 2.

The second lens array 31 includes a plurality of second lenslets 31a. The plurality of second lenslets 31a correspond to the plurality of first lenslets 30a. The second lens array 31 along with the superimposing lens 32 superimposes images of the first lenslets 30a of the first lens array 30 on one another in the vicinity of an image formation area of each of the light modulators 4R, 4G, and 4B, which is an illumination receiving area.

As described above, the illuminator 2 according to the present embodiment outputs the combined light SL1 having an aligned polarization direction as the white illumination light WL toward the image formation area of each of the light modulators 4R, 4G, and 4B. That is, the illuminator 2 according to the present embodiment can produce white illumination light WL having an aligned polarization direction. It is therefore unnecessary to align the polarization direction of the illumination light WL with the direction of the axis of transmission of the polarizer for the liquid crystal panel that form each of the light modulators 4R, 4G, and 4B. A polarization converter used in the case of related art where illumination light having an unaligned polarization direction is used can therefore be omitted. A polarization converter is typically expensive. The illuminator 2 according to the present embodiment that employs no polarization converter therefore allows cost reduction.

Further, it is difficult to reduce the size of a polarization converter due to manufacturing-technology-related constraints at present. In contrast, the illuminator 2 according to the present embodiment, which includes no polarization converter, allows reduction in size of the configuration of the illuminator.

As described above, the projector 1 according to the present embodiment, which includes the compact, inexpensive illuminator 2, can achieve reduction in size and cost of the projector itself. Further, the illuminator 2, which suppresses creation of speckle noise and excels in white balance, allows projection of an image having a small amount of speckle noise.

Second Embodiment

An illuminator according to a second embodiment will subsequently described. In the present embodiment, the same members and configurations as those in the first embodiment have the same reference characters and will not be described in detail.

Figure 3:
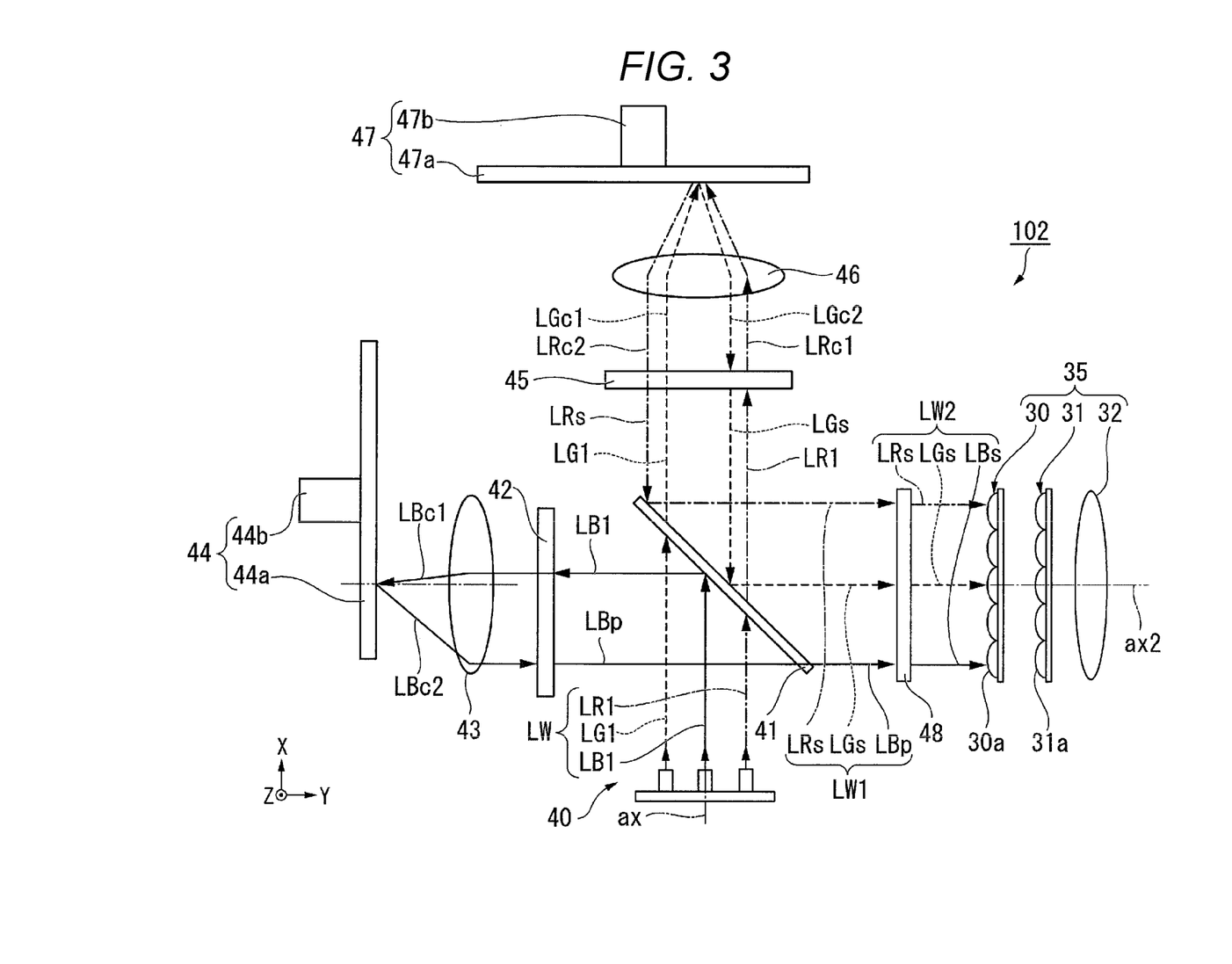
FIG. 3 shows a schematic configuration of an illuminator according to a second embodiment.

FIG. 3 shows a schematic configuration of the illuminator according to the present embodiment. An illuminator 102 includes a light source apparatus 40, a light combiner/separator 41, a first retardation film 42, a first light collection system 43, a first diffuser 44, a second retardation film 45, a second light collection system 46, a second diffuser 47, a predetermined band retardation film 48, and the homogenizing illumination system 35, as shown in FIG. 3.

The following description will be made under the following definitions: The direction in which the illuminator 102 outputs illumination light is a direction Y; the direction in which the light source apparatus 40 outputs light is a direction X; and the direction perpendicular to the directions X and Y is a direction Z. An optical axis ax of the light source apparatus 40 is parallel to the axis X, and the illumination optical axis ax2 is parallel to the axis Y.

In the present embodiment, the light source apparatus 40, the light combiner/separator 41, the second retardation film 45, the second light collection system 46, and the second diffuser 47 are arranged along the optical axis ax of the light source apparatus 40. The first diffuser 44, the first light collection system 43, the first retardation film 42, the light combiner/separator 41, the predetermined band retardation film 48, and the homogenizing illumination system 35 are arranged along the illumination optical axis ax2 of the illuminator 102. The optical axis ax1 and the illumination optical axis ax2 are perpendicular to each other.

Figure 4:
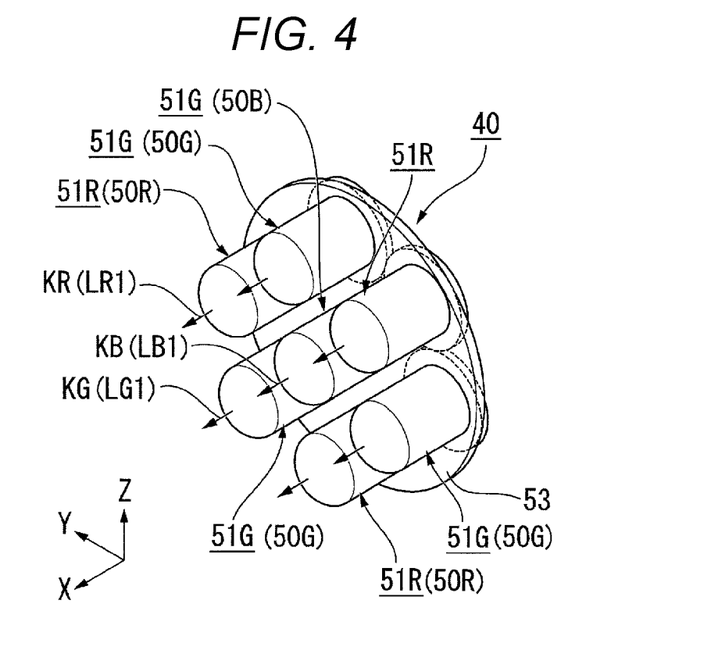
FIG. 4 is a perspective view of a light source apparatus.
Figure 5:
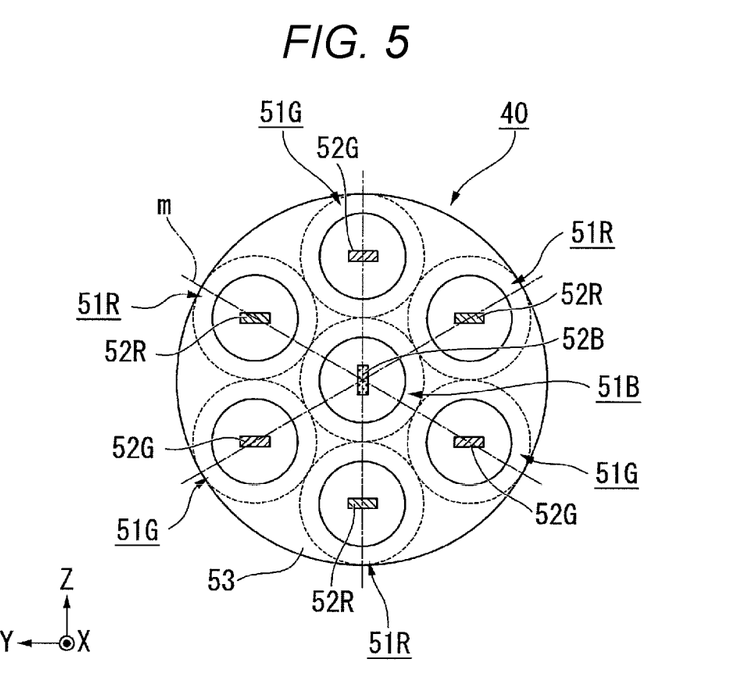
FIG. 5 is a front view of the light source apparatus viewed in the direction in which the light source apparatus outputs light.

FIG. 4 is a perspective view of the light source apparatus 40. In FIG. 4, no seat of part of semiconductor lasers is shown for clarity of the figure. FIG. 5 is a front view of the light source apparatus 40 viewed in the direction in which the light source apparatus 40 outputs light.

The light source apparatus 40 includes a red laser light source section (first laser light source section) 50R, a green laser light source section (second layer light source section) 50G, and a blue laser light source section (third laser light source section) 50B, as shown in FIGS. 4 and 5. The red laser light source section 50R, the green laser light source section 50G, and the blue laser light source section 50B are integrated with and held by a holding member 53. The holding member 53 is not necessarily made of a specific material and is desirably made, for example, of a metal having high thermal conductivity.

The red laser light source section 50R is formed of a plurality of red semiconductor laser devices 51R (first laser devices). The green laser light source section 50G is formed of a plurality of green semiconductor laser devices 51G (second laser devices). The blue laser light source section 50B is formed of at least one blue semiconductor laser device 51B (third laser device).

The light source apparatus 40 in the present embodiment includes three red semiconductor laser devices 51R, three green semiconductor laser devices 51G, and one blue semiconductor laser device 51B, for example, to produce white light having a brightness of 1000 lm. The blue laser light source section 50B may instead include a plurality of blue semiconductor laser devices 51B, that is, only needs to include at least one blue semiconductor laser device 51B. The number of red semiconductor laser devices 51R and the number of green semiconductor laser devices 51G may not necessarily each be three. The number of red semiconductor laser devices 51R may differ from the number of green semiconductor laser devices 51G.

The red semiconductor laser devices 51R each output a red light beam KR as laser light that belongs to the first wavelength band having the peak wavelength of 635 nm±20 nm. The green semiconductor laser devices 51G each output a green light beam KG as laser light that belongs to the second wavelength band having the peak wavelength of 550 nm±30 nm. The blue semiconductor laser device 51B outputs a blue light beam KB as laser light that belongs to the third wavelength band having the peak wavelength of 455 nm±20 nm.

Based on the configuration described above, the red laser light source section 50R outputs red light (first light) LR1 formed of three red light beams KR outputted from the three red semiconductor laser devices 51R. The green laser light source section 50G outputs green light (second light) LG1 formed of three green light beams KG outputted from the three green semiconductor laser devices 51G. The blue laser light source section 50B outputs blue light (third light) LB1 formed of one blue light beam KB outputted from the one blue semiconductor laser device 51B.

The red semiconductor laser devices 51R, the green semiconductor laser devices 51G, and the blue semiconductor laser device 51B are each formed of a CAN-package-type semiconductor laser.

The red semiconductor laser devices 51R each accommodate at least one semiconductor laser chip 52R, the green semiconductor laser devices 51G each accommodate at least one semiconductor laser chip 52G, and the blue semiconductor laser device 51B accommodates at least one semiconductor laser chip 52B, as shown in FIG. 5. The red semiconductor laser devices 51R, the green semiconductor laser devices 51G, and the blue semiconductor laser device 51B are each provided with a collimator lens integrated with the light exiting surface of the semiconductor laser device, as shown in FIG. 3. The red semiconductor laser devices 51R, the green semiconductor laser devices 51G, and the blue semiconductor laser device 51B can therefore each output parallelized light.

In FIG. 5, the semiconductor laser devices 51R each accommodate one semiconductor laser chip 52R, the semiconductor laser devices 51G each accommodate one semiconductor laser chip 52G, and the semiconductor laser devices 51B accommodates one semiconductor laser chip 52B. Instead, the semiconductor laser devices 51R may each accommodate a plurality of semiconductor laser chips 52R, the semiconductor laser devices 51G may each accommodate a plurality of semiconductor laser chips 52G, and the semiconductor laser device 51B may accommodate a plurality of semiconductor laser chips 52B.

Out of the semiconductor laser devices 51R, 51G, and 51B, the blue semiconductor laser device 51B is so disposed on the holding member 53 as to be located in a central portion of the light source apparatus 40. The plurality of green semiconductor laser devices 51G and the plurality of red semiconductor laser devices 51R are so disposed in an area of the holding member 53 that is an area around the blue semiconductor laser device 51B as to surround the blue semiconductor laser device 51B.

The green semiconductor laser devices 51G and the red semiconductor laser devices 51R are so disposed on the holding member 53 as to be located on an imaginary circle around the blue semiconductor laser device 51B. The green semiconductor laser devices 51G and the red semiconductor laser devices 51R are alternately provided along the circumferential direction of the imaginary circle.

The center of the imaginary circle may coincide with the center axis of the blue light LB from the blue laser light source section 50B. The center axis of the red light beam KR outputted from each of the red semiconductor laser devices 51R may intersect the imaginary circle. The center axis of the green light beam KG outputted from each of the green semiconductor laser devices 51G may intersect the imaginary circle.

In the light source apparatus 40 in the present embodiment having the arrangement described above, the angles between a plurality of straight lines m, which each connect the light emission centers of a set of a red semiconductor laser device 51R, a green semiconductor laser device 51G, and the blue semiconductor laser device 51B to each other, are equal to one another or 60°.

The three straight lines m form fan-like shapes each having a central angle formed around the center axis of the blue light LB from the blue semiconductor laser device 51B, and the arcs of the fan-like shapes have the same length. The central angles of the plurality of fan-like shapes are equal to one another and are all 60°. Similarly, the three straight lines m form fan-like shapes each having a central angle formed at the semiconductor laser chip 52B and in the vicinity thereof, and the arcs of the fan-like shapes have the same length. The central angles of the plurality of fan-like shapes are equal to one another and are all 60°.

As described above, the plurality of green semiconductor laser devices 51G are so provided in the area around the blue semiconductor laser device 51B as to be rotationally symmetric around the center axis of the blue light LB1. Further, the plurality of red semiconductor laser devices 51R are so provided in the area around the blue semiconductor laser device 51B as to be rotationally symmetric around the center axis of the blue light LB1.

The configuration in which "the plurality of green semiconductor laser devices 51G are so provided as to be rotationally symmetric around the center axis of the blue light LB1 and as to surround the blue semiconductor laser device 51B" only needs to satisfy the arrangement and positional relationship described above. Similarly, the configuration in which "the plurality of red semiconductor laser devices 51R are so provided as to be rotationally symmetric around the center axis of the blue light LB1 and as to surround the blue semiconductor laser device 51B" only needs to satisfy the arrangement and positional relationship described above.

In the present embodiment, the red semiconductor laser devices 51R, the green semiconductor laser devices 51G, and the blue semiconductor laser device 51 are so oriented that the direction of the linearly polarized light outputted from each of the red semiconductor laser devices 51R and the green semiconductor laser devices 51G differs from the direction of the linearly polarized light outputted from the blue semiconductor laser device 51B. The red semiconductor laser devices 51R and the green semiconductor laser devices 51G each output P polarized light with respect to the color separation system 3 shown in FIG. 1, and the blue semiconductor laser device 51B outputs S polarized light with respect to the color separation system 3 shown in FIG. 1. The red light LR1 and the green light LG1 are incident as P polarized light on the light combiner/separator 41, which will be described later, and the blue light LB1 is incident as S polarized light on the light combiner/separator 41, which will be described later.

The thus configured light source apparatus 40 in the present embodiment outputs white light LW containing the red light LR1, the green light LG1, and the blue light LB1 in the direction X (first direction), as shown in FIG. 3. The white light LW outputted from the light source apparatus 40 is incident on the light combiner/separator 41.

Out of the light LW incident on the light combiner/separator 41, the red light LR1 and the green light LG1 are incident as P polarized light on the light combiner/separator 41, and the blue light LB1 is incident as S polarized light on the light combiner/separator 41. The light combiner/separator 41 is formed of a polarizing beam splitter and has a polarization separation function of separating the light LW into the blue light LB1, which is S polarized light with respect to the polarizing beam splitter, and the red light LR1 and the green light LG1, which are each P polarized light with respect to the polarizing beam splitter.

Specifically, the light combiner/separator 41 reflects the blue light LB1, which is S polarized light, and transmits the red light LR1 and the green light LG1, which are each P polarized light. The thus configured light combiner/separator 41 separates the light LW into the blue light LB1 and the mixture of the red light LR1 and the green light LG1.

The S polarized blue light LB1 reflected off the light combiner/separator 41 is incident on the first retardation film 42. The first retardation film 42 is formed of a quarter-wave plate. The blue light LB1, which is S polarized light, is therefore converted by the first retardation film 42 into, for example, right-handed circularly polarized blue light LBc1, which then enters the first light collection system 43. The first light collection system 43 collects the blue light LBc1 into a spot at the first diffuser 44. The first diffuser 44 includes a diffusion film 44a, which is a reflective optical element, and a driver 44b, which rotates the diffusion film 44a.

On the other hand, the P polarized red light LR1 and green light LG1 having passed through the light combiner/separator 41 are incident on the second retardation film 45. The second retardation film 45 is formed of a quarter-wave plate. The red light LR1 and the green light LG1, which are each P polarized light, are therefore each converted by the second retardation film 45 into, for example, right-handed circularly polarized red light LRc1 and green light LGc1, which then enter the second light collection system 46. The second light collection system 46 collects each of the red light LRc1 and the green light LGc1 into a spot at the second diffuser 47. The second diffuser 47 includes a diffusion film 47a, which is a reflective optical element, and a driver 47b, which rotates the diffusion film 47a. In the present embodiment, the angle of diffusion achieved by the diffusion film 47a of the second diffuser 47 is smaller than the angle of diffusion achieved by the diffusion film 44a of the first diffuser 44.

The blue light LB1 is formed of one blue light beam KB outputted from the one blue semiconductor laser device 51B disposed at the center of the light source apparatus 40. In contrast, the green light LG1 is formed of three green light beams KG outputted from the three green semiconductor laser devices 51G so provided as to be rotationally symmetric around the center axis of the blue light LB1. Similarly, the red light LR1 is formed of three red light beams KR outputted from the three red semiconductor laser devices 51R so provided as to be rotationally symmetric around the center axis of the blue light LB1.

Figure 6A:
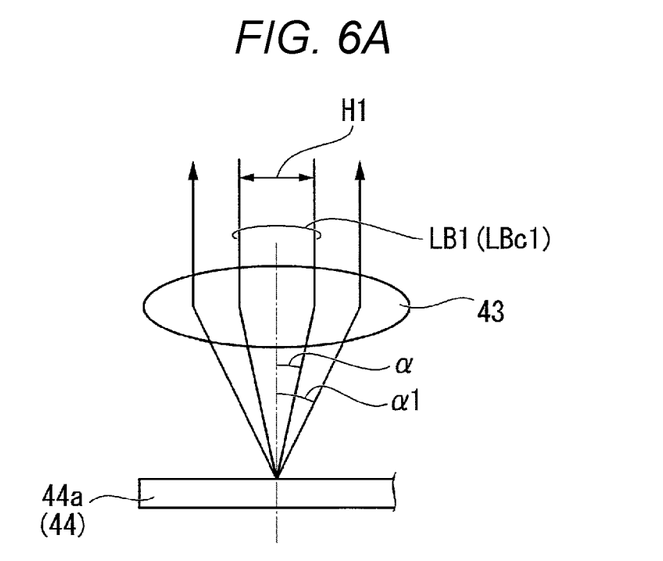
FIG. 6A shows the state of diffusion of light diffused by a first diffuser.
Figure 6B:
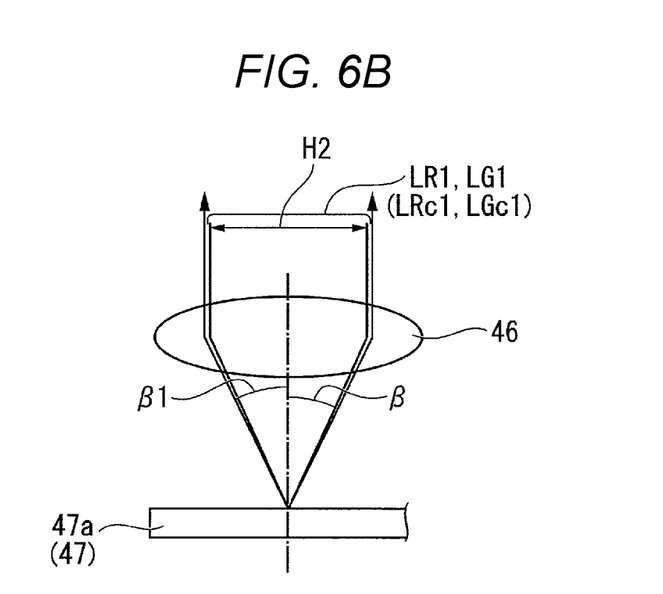
FIG. 6B shows the state of diffusion of light diffused by a second diffuser.

FIG. 6A shows the state of diffusion of the light diffused by the first diffuser 44, and FIG. 6B shows the state of diffusion of the light diffused by the second diffuser 47.

In the light LW outputted from the light source apparatus 40 in the present embodiment, a light flux width H1 of the blue light LB1 (blue light LBc1) is smaller than a light flux width H2 of the green light LG1 (green light LGc1) and the red light LR1 (red light LRc1), as shown in FIGS. 6A and 6B. An angle of incidence α of the blue light LBc1 with respect to the first diffuser 44 is therefore smaller than an angle of incidence β of the green light LGc1 and the red light LRc1 with respect to the second diffuser 47.

Provided that the angle of diffusion of the blue light LB1 diffused by the first diffuser 44 is equal to the angle of diffusion of the green light LG1 and the red light LR1 diffused by the second diffuser 47, the diffusion angle distribution achieved by the blue light LB1 is narrower than those achieved by the green light LG1 and the red light LR1 by the amount corresponding to difference in the angle of incidence a, undesirably resulting in a decrease in the speckle noise suppression effect.

In contrast, in the illuminator 102 according to the present embodiment, an angle of diffusion al of the blue light LB1 (blue light LBc1) diffused by the first diffuser 44 is greater than an angle of diffusion 131 of the red light LR1 (red light LRc1) and the green light LG1 (green light LGc1) diffused by the second diffuser 47, as shown in FIGS. 6A and 6B.

Therefore, the blue light LB1 (blue light LBc1), which is incident at the smaller angle of incidence α with respect to the first diffuser 44, can achieve a diffusion angle distribution comparable to those achieved by the red light LR1 (red light LRc1) and the green light LG1 (green light LGc1), which are incident at the larger angle of incidence β with respect to the second diffuser 47, although the blue light is incident at a small angle of incidence, and can provide a sufficient speckle noise suppression effect. Further, an increase in the diameter of the light flux incident on the first lens array 30 improves the superposition performance provided by the first lens array 30, resulting in improvement in the uniformity achieved by the homogenizing illumination system 35.

The blue light LBc1 diffusively reflected off the first diffuser 44 is hereinafter referred to as blue light LBc2. The red light LRc1 diffusively reflected off the second diffuser 47 is hereinafter referred to as red light LRc2, and the green light LGc1 diffusively reflected off the second diffuser 47 is hereinafter referred to as green light LGc2.

In the illuminator 102 according to the present embodiment, the first diffuser 44 diffusively reflects the blue light LBc1 to produce the blue light LBc2 with the amount of created speckles reduced. For example, right-handed circularly polarized blue light LBc1 is reflected as left-handed circularly polarized blue light LBc2. The blue light LBc2 is converted by the first light collection system 43 into parallelized light, which is then incident on the first retardation film 42. The left-handed circularly polarized blue light BLc2 is converted by the first retardation film 42 into P polarized blue light LBp. The P polarized blue light LBp passes through the light combiner/separator 41.

Further, in the illuminator 102 according to the present embodiment, the second diffuser 47 diffusively reflects the red light LRc1 to produce the red light LRc2 with the amount of created speckles reduced. For example, left-handed circularly polarized red light LRc1 is reflected as right-handed circularly polarized red light LRc2. The red light LRc2 is converted by the second light collection system 46 into parallelized light, which is then incident on the second retardation film 45. The right-handed circularly polarized red light LRc2 is converted by the second retardation film 45 into S polarized red light LRs. The S polarized red light LRs is reflected off the light combiner/separator 41.

Further, in the illuminator 102 according to the present embodiment, the second diffuser 47 diffusively reflects the green light LGc1 to produce the green light LGc2 with the amount of created speckles reduced. For example, left-handed circularly polarized green light LGc1 is reflected as right-handed circularly polarized green light LGc2. The green light LGc2 is converted by the second light collection system 46 into parallelized light, which is then incident on the second retardation film 45. The right-handed circularly polarized green light LGc2 is converted by the second retardation film 45 into S polarized green light LGs. The S polarized green light LGs is reflected off the light combiner/separator 41.

The red light LRs, the green light LGs, and the blue light LBp thus exit out of the light combiner/separator 41 in the same direction. The red light LRs, the green light LGs, and the blue light LBp are therefore combined by the light combiner/separator 41 with one another to form white combined diffused light LW1.

Based on the configuration described above, the light combiner/separator 41 outputs the combined diffused light LW1, which is the combination of the red light LRs, the green light LGs, and the blue light LBp, toward the predetermined band retardation film 48.

The predetermined band retardation film 48 is a half-wave plate. More specifically, the predetermined band retardation film 48 in the present embodiment is formed of a blue-narrow-band ½ retardation film that changes the phase of light that belongs to the wavelength band to which the blue light LB1 belongs. That is, the predetermined band retardation film 48 selectively changes the phase of the blue light LB1 out of the incident combined diffused light LW1. The combined diffused light LW1 passes through he predetermined band retardation film 48, which converts the combined diffused light LW1 into combined diffused light LW2.

Specifically, since the blue light LBp contained in the combined diffused light LW1 is P polarized light, the blue light LBp is converted into S-polarized blue light LBs when passing through the predetermined band retardation film 48. On the other hand, the red light LRs and the green light LGs, which form the remainder of the combined diffused light LW1, do not undergo change in the polarization direction when passing through the predetermined band retardation film 48 but remain S polarized. The combined diffused light LW1 having passed through the predetermined band retardation film 48 is therefore formed of the S-polarized red light LRs, the S-polarized green light LGs, and the S-polarized blue light LBs. The polarization directions of the light fluxes contained in the combined diffused light LW2 are therefore aligned with one another on the downstream of the predetermined band retardation film 48. The combined diffused light LW2 having passed through the predetermined band retardation film 48 is incident on the homogenizing illumination system 35.

As described above, the illuminator 102 according to the present embodiment outputs the combined diffused light LW2 having an aligned polarization direction as the white illumination light WL toward the image formation area of each of the light modulators 4R, 4G, and 4B. That is, the illuminator 102 according to the present embodiment can produce white illumination light WL having an aligned polarization direction. The present embodiment therefore also provides the same effects as those provided by the first embodiment, such as achievement of a compact, inexpensive illuminator 102 that employs no polarization converter and achievement of a compact, inexpensive projector capable of projecting an image having a small amount of speckle noise.

The present disclosure is not limited to the contents of the embodiments described above but can be changed as appropriate to the extent that the change does not depart from the substance of the present disclosure.

In the embodiments described above, a projector including three light modulators is presented by way of example. Instead, the present disclosure is also applicable to a projector that uses a single liquid crystal light modulator to display color video images. Further, a digital micromirror device may be used as each of the light modulators.

Further, the above embodiments of the present disclosure each have been described with reference to the case where the illuminator according to the embodiment is incorporated in a projector, but not necessarily. The illuminator according to each of the embodiments of the present disclosure may also be used as a lighting apparatus, a headlight of an automobile, and other components.

What is claimed is:

1. An illuminator comprising:
   a first laser light source section that outputs a first polarized light flux that belongs to a first wavelength band;
   a second laser light source section that outputs a second polarized light flux that belongs to a second wavelength band;
   a third laser light source section that outputs a third polarized light flux that belongs to a third wavelength band and has a polarization direction different from polarization directions of the first and second light fluxes;
   a light combiner that combines the first, second, and third light fluxes with one another to produce combined light; and
   a predetermined band retardation film that is provided on a downstream of the light combiner and changes a phase of a light flux that forms the combined light and belongs to the third wavelength band, wherein the polarization directions of the light fluxes contained in the combined light are aligned with one another on the downstream of the predetermined band retardation film.

2. The illuminator according to claim 1, further comprising a diffuser provided on the downstream of the predetermined band retardation film.

3. The illuminator according to claim 1, wherein the predetermined band retardation film is a half-wave plate.

4. The illuminator according to claim 2, wherein the predetermined band retardation film is a half-wave plate.

5. An illuminator comprising:
a light source apparatus including a first laser light source section that outputs a first polarized light flux that belongs to a first wavelength band, a second laser light source section that outputs a second polarized light flux that belongs to a second wavelength band, and a third laser light source section that outputs a third polarized light flux that belongs to a third wavelength band and has a polarization direction different from polarization directions of the first and second light fluxes, the light source apparatus outputting light containing the first, second, and third light fluxes;
a light combiner/separator that separates the light outputted from the light source apparatus into the third light flux and a mixture of the first and second light fluxes;
a first diffuser on which the third light flux separated by the light combiner/separator is incident;
a first retardation film provided between the first diffuser and the light combiner/separator;
a second diffuser on which the first and second light fluxes separated by the light combiner/separator are incident;
a second retardation film provided between the second diffuser and the light combiner/separator; and
a predetermined band retardation film provided on a downstream of the light combiner/separator,
wherein the light combiner/separator combines the third light flux diffused by the first diffuser with the first and second light fluxes diffused by the second diffuser to produce combined diffused light,
the predetermined band retardation film changes a phase of a light flux that forms the combined diffused light and belongs to the third wavelength band, and
polarization directions of the light fluxes contained in the combined diffused light are aligned with one another on the downstream of the retardation film.

6. The illuminator according to claim 5, wherein the first, second, and the third light fluxes are outputted in a first direction,
the first laser light source section is formed of a plurality of first laser devices, the second laser light source section is formed of a plurality of second laser devices, and the third laser light source section is formed of at least one third laser device,
the number of first laser devices is greater than the number of third laser devices,
the first laser devices are so provided as to be rotationally symmetric around a center axis of the third light flux and as to surround the third laser device,
the number of second laser devices is greater than the number of third laser devices, and
the second laser devices are so provided as to be rotationally symmetric around the center axis of the third light flux and as to surround the third laser device.

7. The illuminator according to claim 6,
wherein the first light flux is a red light flux,
the second light flux is a green light flux,
the third light flux is a blue light flux, and
the light source section includes three of the first laser devices, three of the second laser devices, and one of the third laser devices.

8. The illuminator according to claim 6,
wherein an angle of diffusion of the third light flux diffused by the first diffuser is greater than angles of diffusion of the first and second light fluxes diffused by the second diffuser.

9. The illuminator according to claim 7,
wherein an angle of diffusion of the third light flux diffused by the first diffuser is greater than angles of diffusion of the first and second light fluxes diffused by the second diffuser.

10. The illuminator according to claim 5,
wherein the predetermined band retardation film is a half-wave plate, and
the first and second retardation films are each a quarter-wave plate.

11. A projector comprising:
the illuminator according to claim 1;
a light modulator that modulates light from the illuminator in accordance with image information to form image light;
and a projection optical apparatus that projects the image light.

12. A projector comprising:
the illuminator according to claim 2;
a light modulator that modulates light from the illuminator in accordance with image information to form image light; and
a projection optical apparatus that projects the image light.

13. A projector comprising:
the illuminator according to claim 3;
a light modulator that modulates light from the illuminator in accordance with image information to form image light; and
a projection optical apparatus that projects the image light.

14. A projector comprising:
the illuminator according to claim 4;
a light modulator that modulates light from the illuminator in accordance with image information to form image light; and
a projection optical apparatus that projects the image light.

15. A projector comprising:
the illuminator according to claim 5;
a light modulator that modulates light from the illuminator in accordance with image information to form image light; and
a projection optical apparatus that projects the image light.

16. A projector comprising:
the illuminator according to claim 6;
a light modulator that modulates light from the illuminator in accordance with image information to form image light; and
a projection optical apparatus that projects the image light.

17. A projector comprising:
the illuminator according to claim 7;
a light modulator that modulates light from the illuminator in accordance with image information to form image light; and
a projection optical apparatus that projects the image light.

18. A projector comprising:
the illuminator according to claim 8;
a light modulator that modulates light from the illuminator in accordance with image information to form image light; and
a projection optical apparatus that projects the image light.

19. A projector comprising:
the illuminator according to claim 9;
a light modulator that modulates light from the illuminator in accordance with image information to form image light; and
a projection optical apparatus that projects the image light.

20. A projector comprising:
the illuminator according to claim 10;
a light modulator that modulates light from the illuminator in accordance with image information to form image light; and
a projection optical apparatus that projects the image light.

* * * * *